March 5, 1935.  W. P. KELLETT  1,993,481
TRANSPORT EQUIPMENT
Filed April 23, 1931  3 Sheets-Sheet 1

Inventor.
William Platts Kellett
by
HJS Dennison
atty.

March 5, 1935.  W. P. KELLETT  1,993,481

TRANSPORT EQUIPMENT

Filed April 23, 1931  3 Sheets-Sheet 2

Inventor.
William Platts Kellett.
by H. J. S. Dennison
atty.

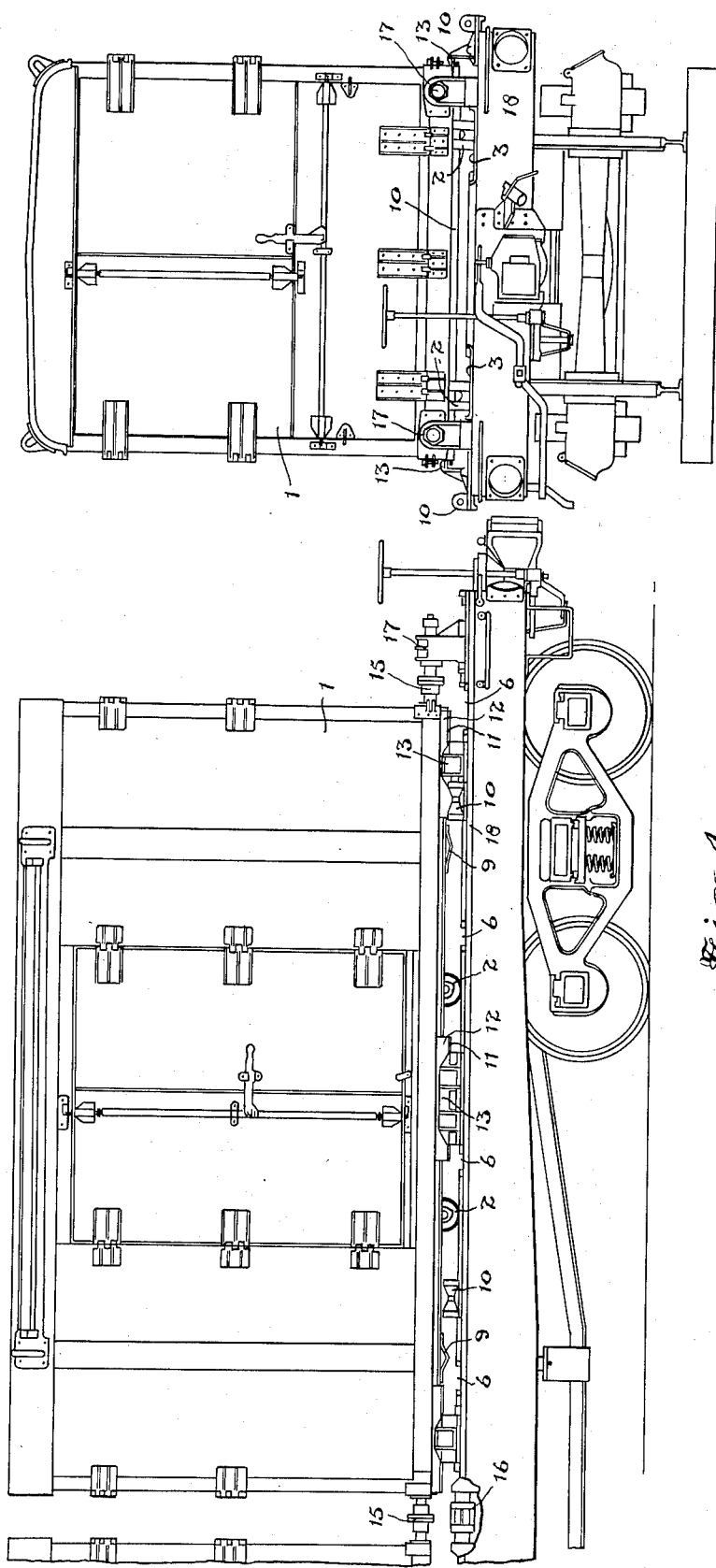

Patented Mar. 5, 1935

1,993,481

UNITED STATES PATENT OFFICE 1,993,481

TRANSPORT EQUIPMENT

William P. Kellett, New York, N. Y.

Application April 23, 1931, Serial No. 532,369

7 Claims. (Cl. 105—366)

The principal objects of this invention are, to provide for the ready trans-shipment of merchandise through the novel construction of a railway carrier, a removable goods container and of a truck to carry said container, whereby the container loaded in the warehouse may be moved on to the truck and carried securely to the railway car and readily transferred with ease to said car from either sides or ends, the container when placed upon the car being locked securely, though readily displacable.

The principal features of the invention consist in providing a railway car and a transportation truck with decks having guide-ways adapted to coincide when placed either side by side or end to end, and means is provided to support the container in moving across the intervening space between the truck and railway car.

A further important feature of the invention consists in the means provided on the railway car for flexibly mounting the goods containers so that they may move in relation to a car and thus avoid the damage due to impact shocks.

In the accompanying drawings, Figure 1 is a plan view of a railway car and a transportation truck shown placed side by side in the position for trans-shipping a container from one to the other, containers being indicated by dotted lines.

Figure 3 is an enlarged end elevational view of a railway car showing a container mounted thereon.

Figure 4 is an enlarged side view of a portion of the freight car showing the container secured thereon.

The problem of freight transportation is an extremely important subject of great interest to the shipping public and to railroad and highway transportation corporations. It is fully appreciated that railway transportation for long distances is vastly cheaper than highway transportation, but because of instantaneous movement and single handling from warehouse to warehouse the excessive cost of road travel is tolerated.

It is the purpose of this invention to facilitate the handling of merchandise with rapid delivery from door to door and to accomplish this result mobile containers are provided which can be readily moved from loading platform to truck and from truck to railway car which then transports over the long distance.

In putting such transportation system into operation it is necessary to provide an equipment which will enable the packing of the goods at the warehouse or factory of the consignor.

Figure 1:
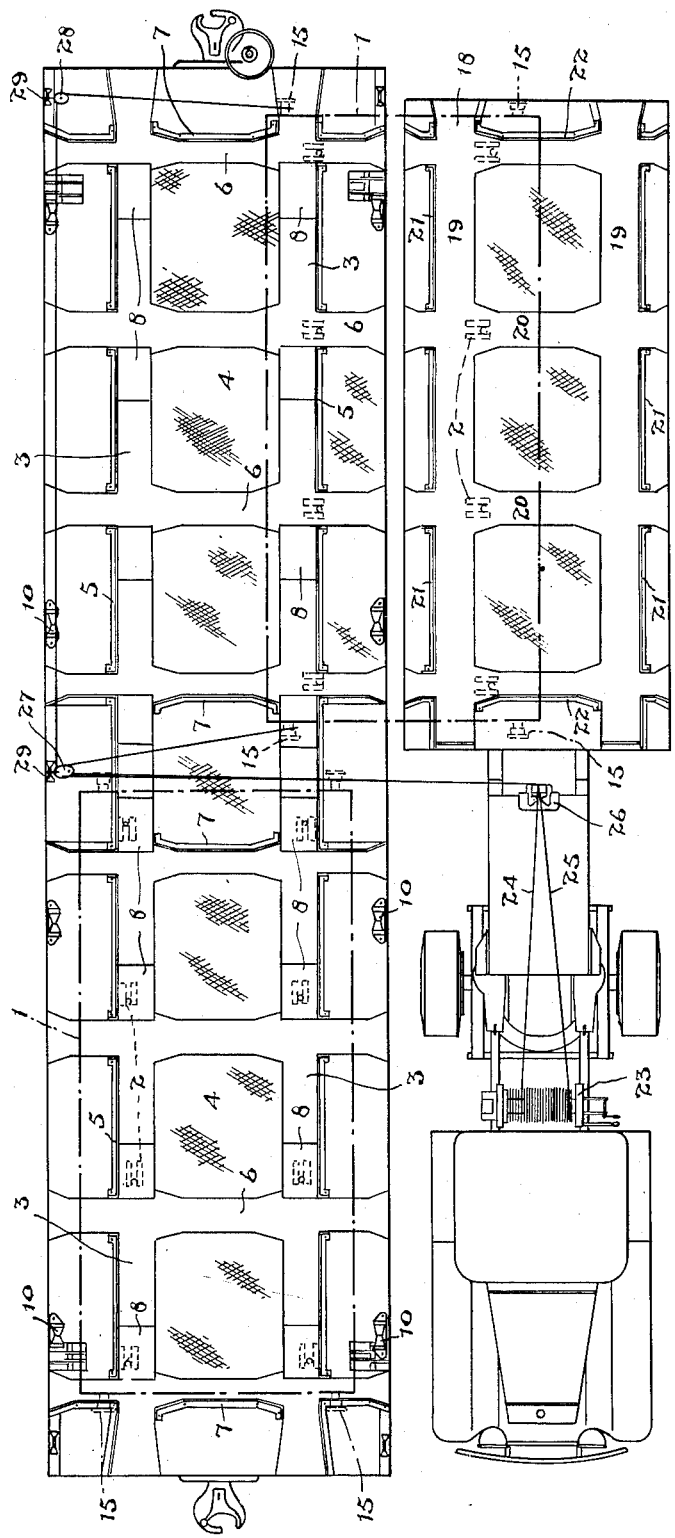
Figure 2:
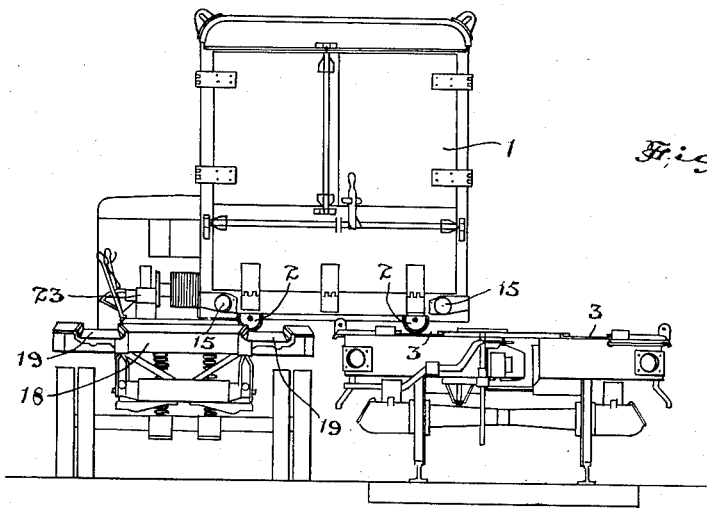
Figure 2 is an end elevational view of the truck and car as illustrated in Figure 1.
Figure 5:
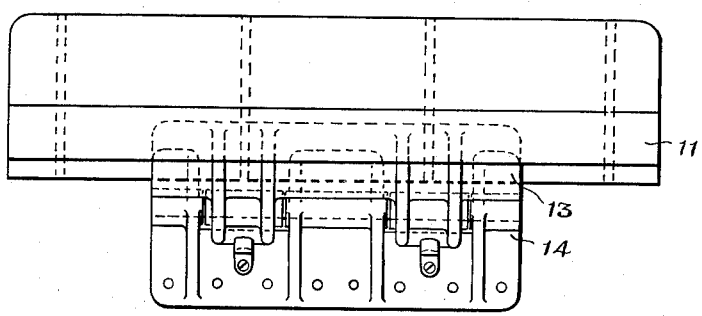
Figure 5 is an enlarged plan detail of one of the side container locking members.

The container 1 which is shown in Figures 2, 3 and 4 may be provided with a suitable arrangement of doors open at the sides or ends, is provided with castor wheels 2 arranged in pairs adjacent to the ends of the container and with intervening pairs all of which are equally spaced apart and in substantially longitudinal alignment.

This arrangement provides that a cantilever support for the container is arranged in the intermediate pairs of castors so that which ever end of the container may be extended beyond the support of the end pairs of castors, the next succeeding pair will support the outer end in a cantilever position until the castors of the outer end can be brought into contact with another supporting surface, that is within reasonable limits, such as may be found in distances between a truck and a railway truck and a truck and a loading platform.

It is frequently found desirable to load or unload a container in a side-wise direction and it is therefore necessary to provide some means for supporting the container when the castors at either side thereof have been moved beyond the supporting surface of either the truck platform or railway car.

In the apparatus herein shown the deck of the railway car is provided with a pair of longitudinal runways 3 which extend from end to end of the car and are spaced apart a distance equal to the gauge of the castors 2 of the container. These runways may be made in any suitable manner from sheet steel or from channel or angle stock in order to provide a smooth, wear-resisting surface on the deck of the car over which the container castors will run easily and the areas between the runways are preferably covered by corrugated plates 4. Side guards 5 are arranged along the outward borders of the runways which may be formed integral with the material of the runways or may comprise separate angle plates secured thereto or to the car deck as shown.

Runways 6 extending transversely of the deck of the car and on the same level with the runways 3 and constructed in a similar manner are arranged spaced apart in accordance with the longitudinal spacing of the castors 2 of the container. These runways extend from side to side of the car and the end runways of each set are provided with angle iron guides 7 to guide the castors of the container when it is moved across the transverse guides of the car.

Adjacent to each of the transverse runways 3 are placed the and in the longitudinal runways 3 are placed the hardened plates 8 upon which the castor wheels normally rest when the container has been placed in position and secured upon the car, the hardened plates withstanding the wear and whatever slight movement the containers may have on the surface.

Each container is provided with transverse guide members 9 which are preferably in the form of steel plates bent into a broad V shape transversely. These guides are adapted to engage rollers 10 mounted in suitable brackets at the sides of the car when the castors are in alignment with the transverse runways 6.

The surface of the rollers is shaped to conform to the transverse V shape of the cross members of the containers and thus prevent endwise movement of the container when it is being moved transversely. The provision of these rollers relieves the end guides 7 from undue wear in moving the container transversely of the car but the particular function is to form a cantilever support for the container when the castors on either side are moved clear of the runways and thus the container is carried across the gap between the car and the truck on to which the container is to be loaded.

Figure 6:
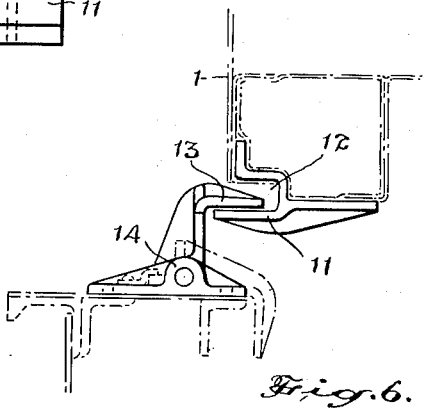
Figure 6 is an end elevational view of the locking members shown in Figure 5.
Figure 7:
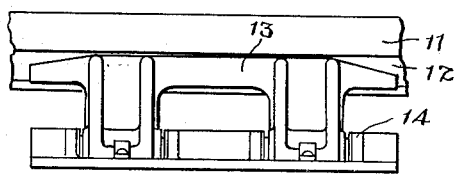
Figure 7 is a back edge view of the side locking member shown in Figure 5.
Figure 8:
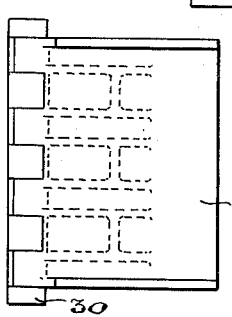
Figure 8 is a plan view.

The container is provided with channel guide members 11 which are in the form of cast steel plates secured to the bottom corners of the container and presenting the horizontal slots 12 which are open at the outward side. These channel members are arranged preferably at the ends and in the centre of the length of the container and the lower flanges thereof are engaged by inwardly turned flange members 13 secured to the deck of the car, as is particularly shown in Figure 6. The flanged member which forms a side stop for the container is hinged to a bracket plate 14 secured to the deck of the car and the hinged member may be swung down as shown in dotted lines to allow the container to pass thereover when the container is being placed in position from the side of the car, but the members 13 may be left in their raised position if the containers are being placed in position endwise of the car as the flanged end simply slips into the channel slot when the container is moved to its final resting position with the castors on the hardened steel plates 8.

It will be seen that in removing the container from a car the endwise movement to bring the castors into alignment with the transverse runways will clear the flange members 13 from the channel side stops 11 when the flange members 13 may be thrown down to allow the container to move thereover.

The containers are provided with spring buffers 15 at the ends and the buffers of the adjacent ends of a pair of containers mounted on the car engage in contact or they engage the centre jacks 16 which are arranged in the car to be thrown up or down and the outer end buffers of the containers are engaged by the end jacks 17 which are preferably adjustable and of a spring type.

The spring bumpers on the containers and the spring end buffers allow the containers to move endwise without becoming disengaged from the side locks and shocks of travel to the car are relieved in transmission to the containers through these spring elements.

The special form of truck provided in this invention is preferably of the semi-trailer type and is provided with a deck 18 divided substantially the same as is the deck of the car having the longitudinal runways 19 corresponding in gauge to the runways 3 and the transverse runways 20 which register with the transverse runways 6 of the car.

Guide flanges 21 are arranged on the outward sides of the longitudinal runways and guide flanges 22 are arranged on the outer of the transverse end guideways 20.

The platform of the truck is preferably of the elevating and fore and aft tilting type so that it may be raised or lowered to be brought into alignment with the deck of a car or a loading platform.

The truck is provided with a winch 23 and cables 24 and 25 are carried from the winch around the roller gadget 26 and extend through snatch blocks 27 and 28 which are hooked into suitable eyes 29 arranged on the car deck.

The cables are passed over the bumpers of the container and on the operation of the winch will pull the container from the truck on to the car or by placing the snatch blocks on the truck side the cables can be utilized to pull the container from the car on to the truck.

It will be noted that the end jacks 17 are arranged so that they can be swung downwardly to permit the container being removed endwise from the car. When thus removed the cantilever arrangement of the castors supports the end of the container as it projects beyond the car until the end castors engage and rest upon the longitudinal runways of the truck which for this purpose is backed into longitudinal alignment with the car runways.

Figure 9:
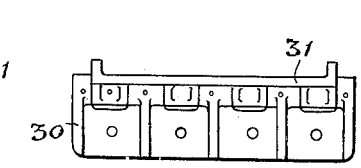
Figure 9 is an end view.
Figure 10:
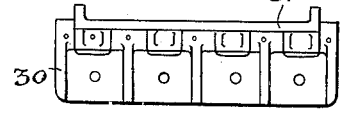
Figure 10 is an edge elevational view of a hinged member for bridging between the truck and the railway car or a loading platform.

The truck is preferably provided with brackets 30 which are secured to the sides of the truck in alignment with the transverse runways and hinged to these brackets are guide plates 31 which form extensions for the runways. These plates ordinarily hang downwardly, as illustrated in dotted lines in Figure 9 and are particularly useful when the road space for manipulating the truck adjacent to a platform is limited and the container is to be loaded sideways upon the truck.

With an equipment such as described goods can be loaded into a container at the factory or warehouse. The containers can be rolled endwise or sideways on to the truck and transported to the railway where the car is placed in a train or upon a siding.

The container is unloaded directly on to the railway car either from the side or end in a very simple and effective manner and it is then secured in position in such a manner as to be transported to its destination with the least possible stress upon its contents.

The arrangement of the transverse guide members 9 under the containers and the co-operating rollers 10 makes it possible to handle containers either in removing them from the car or placing them thereon, to and from an ordinary truck, as the rollers arranged at the outermost edge of the car will carry the outward edge of the container a distance well beyond the side of the car to ensure its castor wheels resting upon the supporting deck of the truck before the container passes its centre of gravity.

What I claim as my invention is:

1. Improved freight handling equipment comprising a transport member having longitudinal and transverse intersecting runways on the open deck thereof and goods containers provided with swivel castors for co-operation with either of said runways, in combination with displaceable holding means on said transport engageable with said containers only when the castors thereof are disposed in the longitudinal runways out of register with the transverse runways, and means acting in an auxiliary capacity to said transverse runways to guide the container in its transverse movement on said transverse guideways, said means being out of engagement when the container is in its "held" position with the castors out of register with the transverse runways.

2. Improved freight handling equipment comprising a transport member having longitudinal and transverse intersecting runways on the open deck thereof and goods containers provided with swivel castors for co-operation with either of said runways, in combination with displaceable holding means on said transport engageable with said containers only when the castors thereof are disposed in the longitudinal runways out of register with the transverse runways, and guide members secured transversely of the container bottom and engageable with guide rollers disposed at the sides of the transport deck, said guide members and rollers being normally disposed out of engagement and register in the "held" position of the container and adapted to register and engage only when the castors are aligned with the transverse runways to impart an auxiliary support to the container.

3. Improved freight handling equipment comprising a transport member having longitudinal and transverse intersecting runways on the open deck thereof and goods containers provided with swivel castors for co-operation with either of said runways, in combination with displaceable holding means on said transport engageable with said containers only when the castors thereof are disposed in the longitudinal runways out of register with the transverse runways, said holding means consisting in part of holding flanges hinged to the transport member at the sides to swing downwardly clear of the container and engageable with flanges on the container only when in their raised position and when the container castors are disposed out of register with the transverse runways, said hinged flanges when swung down being clear of the container bottom to clear the same for transverse shifting of the container.

4. Improved freight handling equipment comprising a transport car, goods containers having castor wheel supports operating on the deck of said transport to enable the container to be rolled off or on the deck in both longitudinal and transverse directions to or from a second deck or platform and having in combination therewith auxiliary guide means co-operatively interposed between the car deck and the container and normally out of guiding contact whereby not to interfere with the desired positioning of the container on the car deck and being positioned for cooperative guiding engagement during the transverse rolling of the container to preserve the stability of the container during side transfer, and means for retaining the containers on the car deck during transit.

5. Improved freight handling equipment comprising a transport car, goods containers having castor wheel supports operating on the deck of said transport to enable the container to be rolled off or on the deck in both longitudinal and transverse directions to or from a second deck or platform, and having in combination therewith auxiliary guide means interposed between the car deck and container and normally offset in a direction transversely of the car deck to permit free longitudinal rolling of the container on the car deck and operative on the transverse rolling of the container onto or off the deck to present an auxiliary guide whereby the stability of the container is preserved in transfer, and means for holding the container in position on the car deck during transit.

6. Improved freight handling equipment comprising a transport car, goods containers having castor wheel supports operating on the deck of said transport to enable the container to be rolled off or on the deck in both longitudinal and transverse directions to or from a second deck or platform, and having in combination therewith auxiliary guide means comprising transverse underslung tracks on the underside of the container and guide rollers at the sides of the car deck and normally spaced outwardly from the ends of the underslung tracks of the container to clear the same to permit unobstructed rolling of the containers longitudinally of the car deck, said underslung tracks and side rollers being interengageable during transverse rolling of the container as an auxiliary guide means to preserve the stability of the container, and means for holding the container on the deck in transit.

7. Improved freight handling equipment comprising a mobile unit having a deck or platform, a container having spaced sets of wheels to be rolled on and off said deck or platform to or from a second deck or platform between which a gap exists, underslung guide rails secured to the underside of said container, and auxiliary guide rollers mounted at the edge extremity only of the deck or platform and co-operatively related with said underslung guide rails and with the container wheels to impart an auxiliary stabilizing rolling support to the container respectively as the advance and rear sets of container rollers are moving across said gap for rolling contact with the adjacent deck or platform.

WILLIAM P. KELLETT.